(12) United States Patent
Straney et al.

(10) Patent No.: US 7,586,515 B2
(45) Date of Patent: Sep. 8, 2009

(54) INSTRUMENT FOR REAL-TIME VIDEO QUALITY MEASUREMENT

(75) Inventors: Gale L. Straney, Tigard, OR (US); Wilfried M. Osberger, Barcelona (ES)

(73) Assignee: Tektronix, Inc., Beaverton, OR (US)

( * ) Notice: Subject to any disclaimer, the term of this patent is extended or adjusted under 35 U.S.C. 154(b) by 398 days.

(21) Appl. No.: 11/135,726

(22) Filed: May 23, 2005

(65) Prior Publication Data
US 2006/0262191 A1 Nov. 23, 2006

(51) Int. Cl.
H04N 17/00 (2006.01)
H04N 17/02 (2006.01)
(52) U.S. Cl. .................................. 348/190; 348/180
(58) Field of Classification Search ............. 348/180, 348/181, 192, 189, 190
See application file for complete search history.

(56) References Cited

U.S. PATENT DOCUMENTS

| | | | |
|---|---|---|---|
| 5,818,520 A | 10/1998 | Janko et al. | |
| 5,894,324 A | 4/1999 | Overton | |
| 6,259,477 B1 | 7/2001 | Hu | |
| 6,271,879 B1 * | 8/2001 | Overton | 348/180 |
| 6,295,083 B1 | 9/2001 | Kuhn | |
| 6,400,400 B1 | 6/2002 | Isnardi et al. | |
| 6,483,538 B2 | 11/2002 | Hu | |
| 6,633,329 B2 | 10/2003 | Janko et al. | |
| 6,690,840 B1 | 2/2004 | Janko et al. | |
| 6,751,360 B1 | 6/2004 | Lu | |
| 6,751,360 B1 | 6/2004 | Lu | |
| 2003/0081124 A1 | 5/2003 | Balasubrawmanian et al. | |

* cited by examiner

*Primary Examiner*—M. Lee
(74) *Attorney, Agent, or Firm*—Francis I. Gray; Michael A. Nelson

(57) ABSTRACT

A realtime video quality measurement instrument may be configured for both double-ended and single-ended operation. For double-ended operation reference and test video signals are stored in respective buffers and spatial/temporally aligned. Desired quality measurements are performed on the aligned frames of the test and reference video signals according to stored setup instructions. For single-ended operation the reference video signal and a signature for the reference video signal are pre-stored together with the desired quality measurements for the frames of the reference video signal. Then the test video signal is received, signatures determined, and the test and reference video signals aligned using the signatures. The desired quality measurements are then performed on the aligned frames of the test and reference video signals.

3 Claims, 4 Drawing Sheets

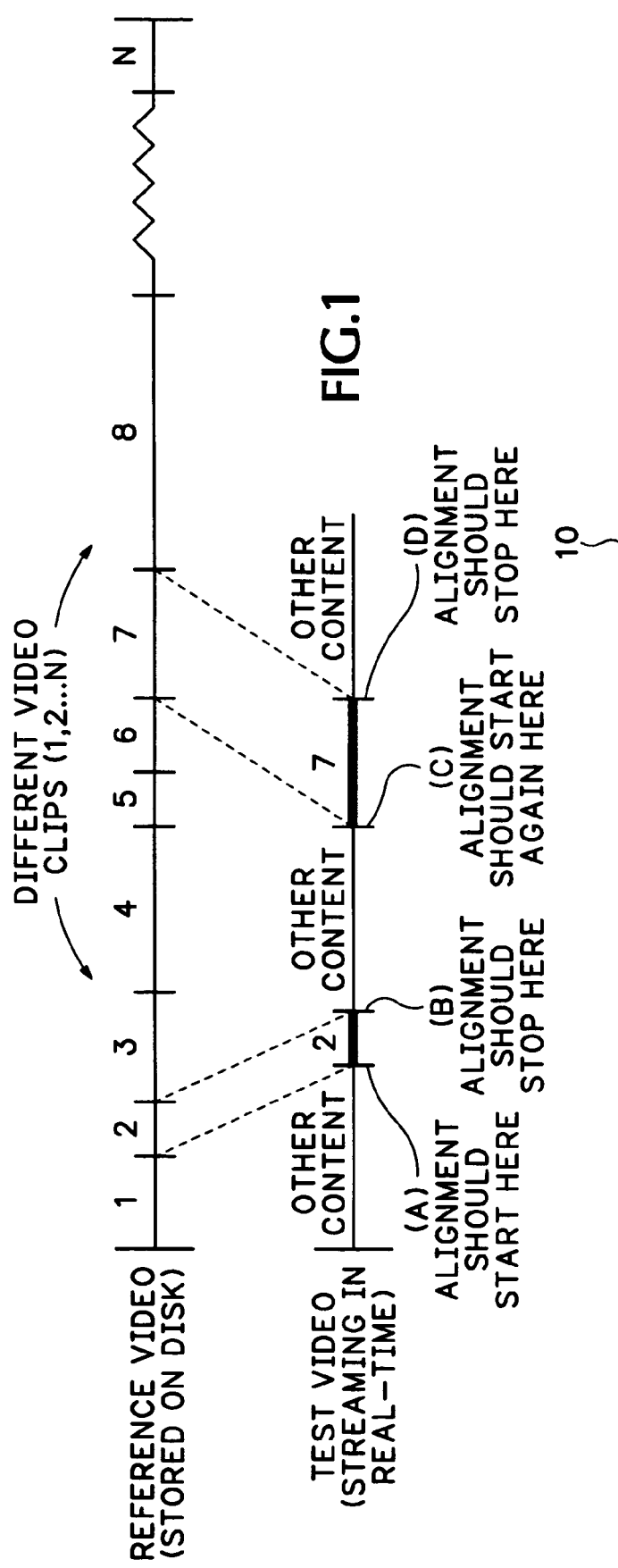
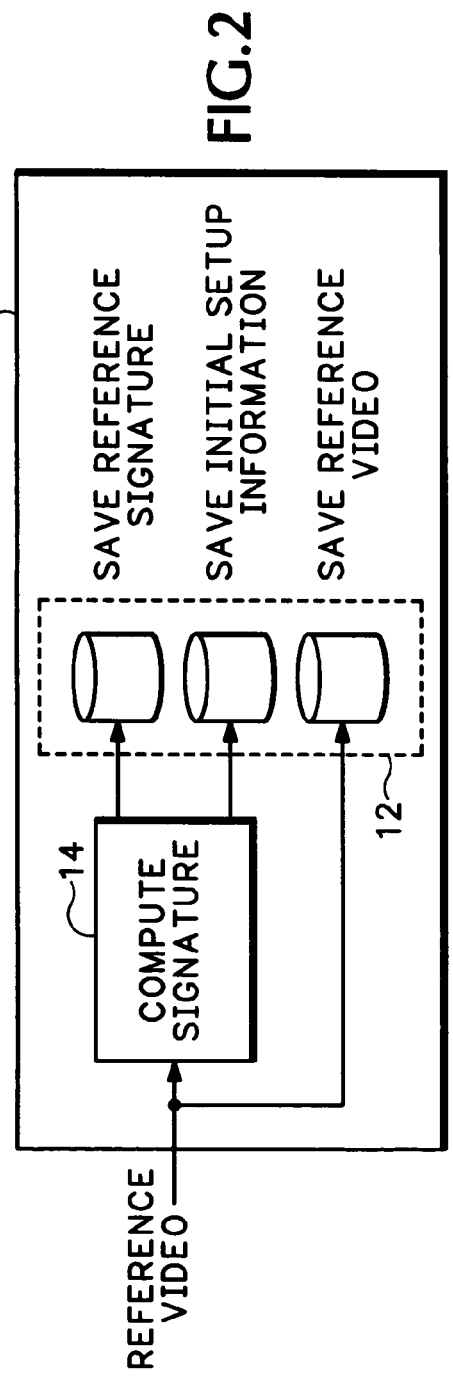

INSTRUMENT FOR REAL-TIME VIDEO QUALITY MEASUREMENT

BACKGROUND OF THE INVENTION

The present invention relates to video quality measurements, and more particularly to an instrument for real-time video quality measurements which automatically measures video quality and monitors and logs when selected video clips have been received.

Modern digital video systems may introduce distortions into a video image via a number of different means, such as compression, transcoding, transmission errors, analog distortions, etc. In order to measure the quality of the video at the picture level, i.e., the quality of the final decoded picture, it is necessary to either:

- perform subjective testing using human operators who determine video quality of the pass/fail status of a device,
- use a single-ended video measurement device, such as the Tektronix PQM300 Picture Quality Monitor which does not accurately detect many types of errors as it does not use a reference sequence, or
- measure the video off-line using a video quality measurement device, such as the Tektronix PQA300 Picture Quality Analyzer (see U.S. Pat. No. 5,818,520) which has many restrictions including a limited sequence length, modification of video content to achieve alignment, and non-realtime operation.

In many applications the video content cannot be restricted or modified in any way in order to achieve alignment. The quality measurement device needs to be able to rapidly drop in and out of alignment as the test video content changes, and needs to perform measurements to produce error maps, graphs or pass/fail decisions in real-time. None of the current alternatives offers an adequate solution to this problem, so human operators are still typically used to perform the quality measurement task. This is not desirable since it is known that the results achieved by human operators are not objective or repeatable, are prone to error, and are expensive.

What is desired is a video quality measurement instrument that accepts any video content, does not modify the video content, rapidly achieves temporal and spatial alignment when test video matches reference video, rapidly drops out of alignment once test video fails to match reference video, works with very long sequences, enables a programmable video quality measurement including setting pass/fail thresholds, selecting regions of interest for computing quality and measuring different channels, logs all results and keeps a record of when a particular reference clip is played so that the user may keep track of both the time, frequency and quality at which a particular clip was shown, allows both single-input operation and double-input operation, and operates in real-time.

BRIEF SUMMARY OF THE INVENTION

Accordingly the present invention provides an instrument for real-time video quality measurements that may be configured for both double-ended and single-ended operation. For double-ended operation reference and test video signals are stored in respective buffers and spatial/temporally aligned. Desired quality measurements are performed on the aligned frames of the test and reference video signals according to stored setup instructions. For single-ended operation the reference video signal and a signature for the reference video signal are pre-stored together with the desired quality measurements for the frames of the reference video signal. Then the test video signal is received, signatures determined, and the test and reference video signals aligned using the signatures. The desired quality measurements are then performed on the aligned frames of the test and reference video signals.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 1 is a graphic view of reference and test videos requiring rapid alignment according to the present invention.

FIG. 2 is a block diagram view for capturing a reference video according to the present invention.

DETAILED DESCRIPTION OF THE INVENTION

Figure 3:
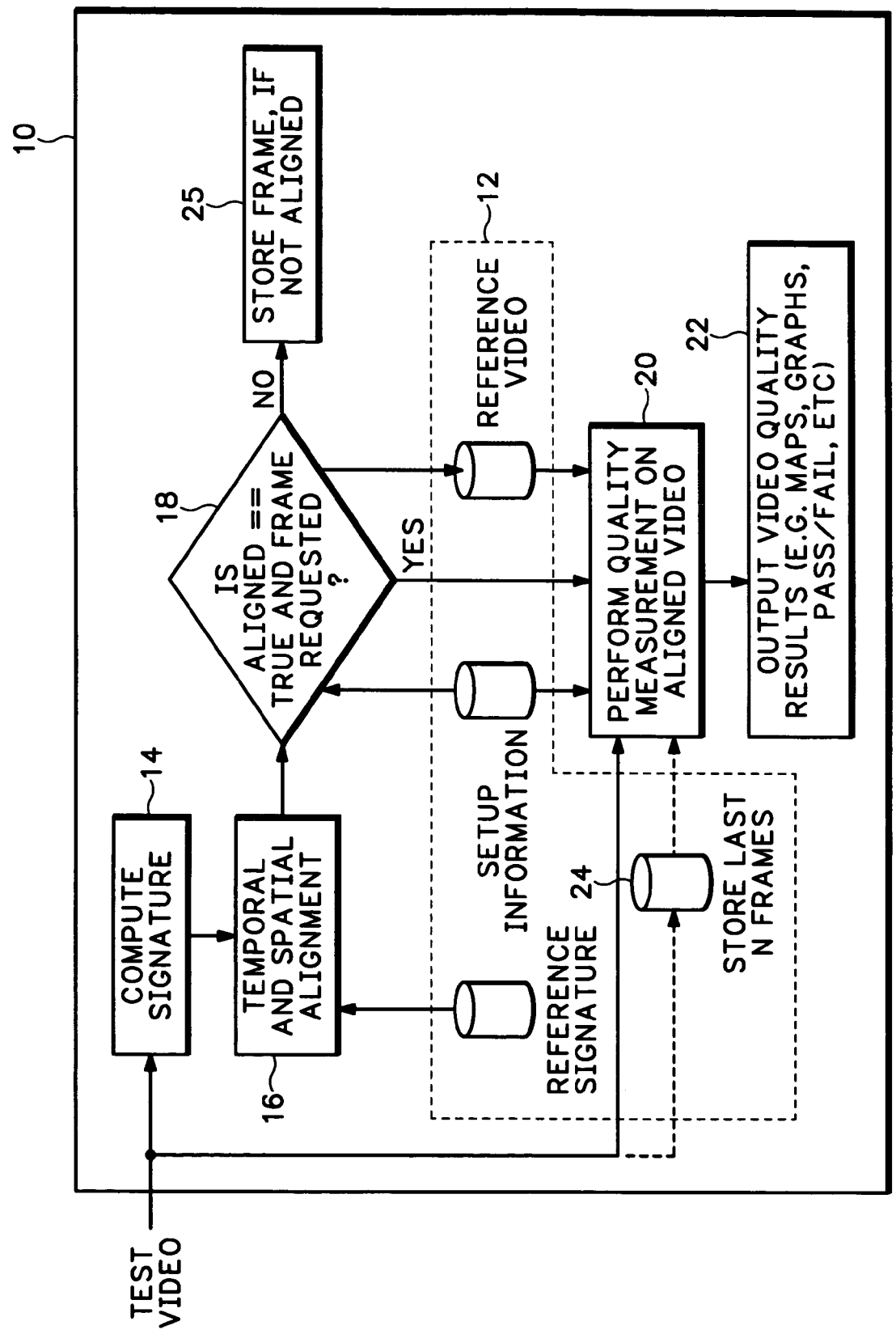
FIG. 3 is a block diagram view of a single-input instrument for performing real-time video quality measurements according to the present invention.

An example of alignment requirements for a real-time video quality measurement instrument is shown in FIG. 1. In this example of single-input operation a reference video is captured and stored in a memory device, such as a disk, and contains a number of different video clips (1, 2, . . . , n). The lengths of these clips may vary from a few seconds up to several minutes such that the overall length of the reference video may be hours. A test video is streamed in real time and contains one or more different clips which match those in the reference video. The challenge for a temporal alignment process is to obtain a rapid alignment as soon as the test video matches the reference video, i.e., points A and B in FIG. 1, and staying unaligned while the content of the test video does not match the content of the reference video, i.e., prior to A, in between B and C, and after D in FIG. 1. When the reference and test videos are aligned, then a video quality measurement algorithm may be used to determine the quality of the test video during the aligned video clips. Since each video clip is different, each may have a different quality requirement with different pass/fail thresholds, regions of interest, or even different video quality assessment algorithms. As well as providing information about video quality, the ability to log the time that each video clip is shown and its frequency of occurrence may also be very important.

The real-time video quality measurement instrument may be configured in two different ways—single-input or double-input—depending on the environment in which it is to operate. Single-input operation operates only on a single video sequence at any time. Therefore in order to compare the reference and test videos the reference is first captured and stored in the instrument. This process is depicted in FIG. 2. The reference video is input to the instrument 10 and saved on a storage device 12, such as a disk. The reference video is also processed by a signature module 14 to compute a signature for each frame of the reference video, and these signatures also are saved on the storage device 12. These signatures may be computed by a number of different methods, and may include the mean for each frame, a difference in mean between frames, a standard deviation for each frame or an inter-frame correlation (see U.S. Pat. No. 6,751,360). The signatures are used to perform temporal alignment of the reference and test videos. Initial setup information also is saved on the storage device 12 with the signatures. The setup information is used to control the video quality measurement process, and may be modified by a user so that the measurement process occurs in a desired way. The setup information includes: the number of video clips in the reference video and their location within the reference sequence (index); the type of video quality measurement to be performed on each video clip; a spatial region of interest for each video clip; a selection of which luminance and chrominance channels to measure for each video clip; thresholds for quality measurement for each video clip such as pass/fail criteria, gain/level shift tolerance, etc.; and which of the video clips to use for the measurement. Once the setup information is adjusted to meet the user's specific requirements, the instrument 10 is ready to perform a measurement.

The measurement process is illustrated in FIG. 3. The test video is input to the instrument 10 and processed by the signature processor 14 to compute its signature in the same manner as the signature for the reference video was computed. The reference video signature from the storage device 12 and the test video signature from the signature processor 14 are input to a spatial/temporal alignment processor 16 to determine if alignment is possible. U.S. Pat. No. 6,259,477 describes one type of spatial/temporal alignment process. If alignment is achievable and if a current test frame is selected to be measured using setup information from the storage device 12 for the corresponding reference frame (decision 18), then a measurement algorithm processor 20 is accessed and the appropriate measurement algorithm determined by the setup information is performed to measure video quality between the current test frame and the corresponding reference frame from the storage device. A number of different video quality metrics may be used for this purpose, depending upon the application and processing power available. Simple metrics such as PSNR and MSE may be used, or more complex models based on a Human Visual System (HVS) may be used as well, as long as they are not excessively computationally expensive so as to prevent real-time operation. The choice of the metric to use and any parameters or thresholds associated with the particular video clip being tested are specified in the setup information. Any outputs 22 from the quality measurement algorithm processor 20, such as error maps, graphs or pass/fail decisions, are provided for further processing or display by the instrument 10.

If alignment is not possible, or if the current test frame is not requested to be measured according to the setup information for the corresponding reference frame, then no measurement is performed for the test frame. If alignment is not achieved, then the current test frame may be stored (step 25) in a buffer 24 that stores the last N test frames, where N is the maximum number of test frames that may be required to establish temporal alignment, typically a few seconds of video. This is done if it is required that no test frames are missed in a clip due to time taken to achieve alignment. For example, referring back to FIG. 1, it may take several test frames after point A until alignment is actually achieved and video quality results are being output. If video quality measurement results are required for these test frames, i.e., the frames between A and the time when alignment is achieved, then the test storage buffer 24 may be used to store these frames. Once alignment is achieved, the quality measurement may be performed on these missed frames as well, either in spare processor time or when the measurements are finished for the current video clip.

Figure 4:
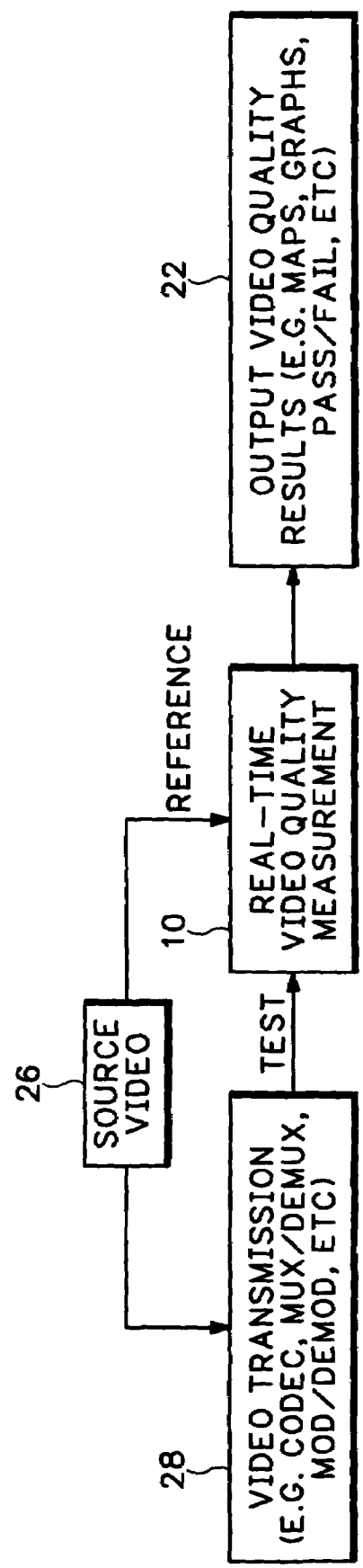
FIG. 4 is a graphic view of a scenario for a double-input instrument according to the present invention.

In the alternative configuration of the instrument 10, a double-input scenario may be used as shown in FIG. 4. In this case the reference and test videos are both input to the instrument 10 simultaneously. The reference video is input directly from a video source 26 while the test video is input via a video processing/transmission path 28. The reference and test videos do not need to be aligned as they enter the instrument 10, since the instrument performs the temporal and spatial alignment.

Figure 5:
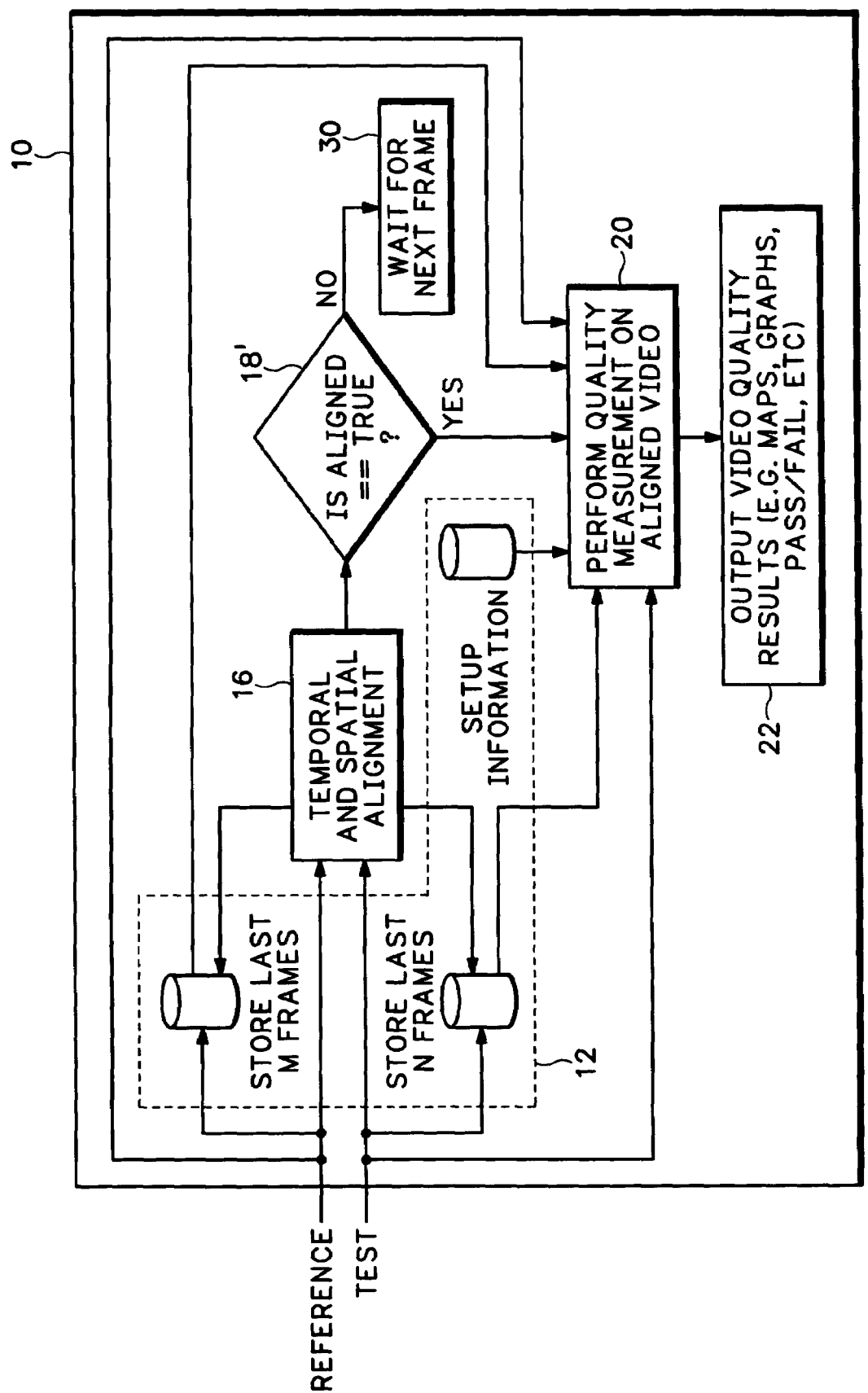
FIG. 5 is a block diagram view of a double-input instrument for performing real-time video quality measurements according to the present invention.

The operation of the instrument 10 as a double-input instrument is shown in FIG. 5. The last M frames of both the reference and test videos are saved in the storage device 12, where M is the maximum possible temporal offset that may be possible between the reference and test videos. Temporal and spatial alignment between the reference and test videos is calculated by the alignment processor 16. If alignment is achieved as determined by decision 18', then the appropriate frame from the saved reference or test videos are input to the video quality measurement processor 20 together with the related setup information in the storage device 12 along with the current test or reference frame, otherwise the alignment process waits for the next frame (step 30). For example, if it is found that the current test frame matches the reference frame that occurred five frames previously, i.e., the temporal offset is five frames, then the current test frame is passed to the quality measurement processor 20 along with the reference frame from five frames previously. The temporal and spatial offset between the reference and test videos may be output by the instrument 10, as this is useful information in many applications. As with the single-input configuration the choice of which video quality metric to use in the video quality measurement processor 20 depends on the computational limitations of the instrument 10 and the requirements of the particular application. Thresholds and parameters for the quality measurement are taken from the setup information. The instrument 10 produces the results provided by the quality computation in the form of error maps, graphs and pass/fail decisions. Error maps may be saved to the storage device if the error exceeds a particular threshold so that significant errors may be identified and diagnosed later. Note that in the double-ended scenario the signature computation module 14 shown in FIG. 1 is bypassed.

For the spatial/temporal alignment generally (i) test frames are time aligned to reference frames, and then (ii) the test frames are spatially aligned with the corresponding reference frames. The significant feature for a realtime video quality algorithm is to perform the spatial/temporal alignment significantly faster than real time so that enough processor (20) time is available to still perform the desired realtime quality measurements.

Thus the present invention provides a real-time video quality measurement instrument that provides both single-input and double-input video quality measurement capabilities, provides temporal and spatial alignment in real time between reference and test videos, and computes real-time picture quality metrics for selected frames as determined by setup information for each video clip of the reference video and the processing capabilities of the instrument for a particular application.

What is claimed is:

1. A realtime video quality measurement apparatus comprising:

means for spatial/temporal aligning a test video signal with a reference video signal without modifying the video content of the test video signal;

means for storing the test video signal and the reference video signal together with setup information that indicates a desired quality measurement process; and means for performing the desired quality measurement process on aligned frames of the test and reference video signals to provide video quality results in realtime.

2. The apparatus as recited in claim 1 further comprising means for computing a signature for the test and reference video signals, the signature for the reference video signal being stored in the storing means together with the reference video signal prior to receiving the test video signal to enable single-ended operation of the apparatus.

3. The apparatus as recited in claim 2 further comprising means for buffering frames of the test video signal when not aligned with frames of the reference video signal as determined by the spatial/temporal aligning means so all frames of the test video signal corresponding to the reference video signal are processed by the performing means once alignment is achieved between the test and reference video signals by the spatial/temporal aligning means.

* * * * *